US007461521B2

United States Patent
Davey et al.

(10) Patent No.: US 7,461,521 B2
(45) Date of Patent: Dec. 9, 2008

(54) SYSTEM UNIT FOR DESORBING CARBON DIOXIDE FROM METHANOL

(75) Inventors: William Davey, Frankfurt am Main (DE); Manfred Meyer, Friedrichsdorf (DE)

(73) Assignee: Lurgi AG, Frankfurt/Main (DE)

( * ) Notice: Subject to any disclaimer, the term of this patent is extended or adjusted under 35 U.S.C. 154(b) by 325 days.

(21) Appl. No.: 10/520,292

(22) PCT Filed: Apr. 19, 2003

(86) PCT No.: PCT/EP03/04112

§ 371 (c)(1),
(2), (4) Date: Dec. 2, 2005

(87) PCT Pub. No.: WO2004/004870

PCT Pub. Date: Jan. 15, 2004

(65) Prior Publication Data

US 2006/0107690 A1    May 25, 2006

(30) Foreign Application Priority Data

Jul. 3, 2002    (DE) .............................. 102 29 750

(51) Int. Cl.
*F25J 3/00*    (2006.01)
(52) U.S. Cl. .............................. 62/617; 62/928; 62/636
(58) Field of Classification Search ................... 62/617, 62/928, 636
See application file for complete search history.

(56) References Cited

U.S. PATENT DOCUMENTS

| 4,252,548 | A | * | 2/1981 | Markbreiter et al. | .......... 62/632 |
| 4,421,535 | A | * | 12/1983 | Mehra | .......... 62/625 |
| 4,675,035 | A | * | 6/1987 | Apffel | .......... 62/625 |
| 4,822,393 | A | * | 4/1989 | Markbreiter et al. | .......... 62/632 |
| 5,061,465 | A | * | 10/1991 | Carter | .......... 423/229 |

FOREIGN PATENT DOCUMENTS

DE    3902276    *    8/1990

* cited by examiner

*Primary Examiner*—William C Doerrler
(74) *Attorney, Agent, or Firm*—Andrew Wilford

(57) ABSTRACT

The invention relates to a system unit for desorbing carbon dioxide and other impurities from highly pressurized methanol. Said system unit comprises at least one or more expansion vessels arranged in succession, at least one heat exchanger, and at least one liquid/gas separator. The inventive system unit contains: a) a line (1) through which the intensely cooled methanol leaving expansion vessel (C) is introduced into the heat exchanger (E) from underneath, and; b) a line (2), though which the heated methanol is drawn out of the heat exchanger (E) from the top, and which serves to connect said heat exchanger to a liquid/gas separator inside of which the remaining carbon dioxide still contained in the methanol is desorbed and separated out to the greatest possible extent. This system unit enables the cold due to evaporation, said cold resulting during the desorption of carbon dioxide, to be obtained inside a heat exchanger and constitutes an important cold energy source for carrying out absorption.

11 Claims, 2 Drawing Sheets

SYSTEM UNIT FOR DESORBING CARBON DIOXIDE FROM METHANOL

CROSS REFERENCE TO RELATED APPLICATIONS

This application is the US national phase of PCT application PCT/EP2003/004112, filed 19 Apr. 2003, published 15 Jan. 2004 as WO 2004/004870, and claiming the priority of German patent application 10229750.9 itself filed 3 Jul. 2002, whose entire disclosures are herewith incorporated by reference.

FIELD OF THE INVENTION

The invention relates to a system for the total purification of compressed gases, and that makes it possible to recover methanol in a pure state while at the same time utilizing the thermal energy liberated in an extremely effective way.

BACKGROUND OF THE INVENTION

It is known that cold methanol has the capability of absorbing large amounts of gas impurities. Use is made of this capability in the Rectisol® process, in which the total purification of compressed gases is possible in a single process operation. The absorptive capability of methanol increases considerably at lower temperatures. At $-60°$ C. for example 75 times more carbon dioxide dissolves in methanol than in the same volume of water at $25°$ C., that is the methanol cycle amounts to $\frac{1}{75}$ compared with water recirculation in a pressurized water cycle. At lower temperature the vapor pressure of methanol is so low that there is little use of solvent.

The Rectisol® process is particularly efficient when large amounts of gas impurities must be removed, or if a particularly high gas purity is required, and overall where the process can be built into the cold stage of a low temperature gas decomposition. In the latter case the process itself offers important advantages when only small quantities of gaseous impurities are to be washed out.

Gas washing is carried out such that the standing raw gas is treated with methanol under medium pressure of 5 to 40 atmospheres or also under high pressure of 50 to 200 atmospheres at temperatures between $10°$ C. and $-80°$ C.

This way, all gaseous impurities such as raw gasoline, crude benzene, ammonia, hydrocyanic acid, resin formers, organic sulfur and phosphorus compounds, carbonic acid, hydrogen sulfide, iron and other metal carbonyls and water are absorbed. The loaded-up methanol is then regenerated by expansion, evaporation, or heating, and subsequently re-used. The impurities can be recovered from the off-gases or condensate. This process is the subject of German patent 1 544 080 (U.S. Pat. No. 3,453,835).

An especially important gas purification process known in the art includes purification of, for example, synthesis gases produced from natural gas gasification processes, which are the starting point for a variety of major technical syntheses. Raw synthesis gas contains considerable amounts of carbon dioxide whose removal is crucially important for the further use of synthesis gasses. The development of effective, reliable, and cost-effective processes for removal of carbon dioxide from synthesis gasses is therefore of considerable importance for the efficient production of a variety of applicable gas mixtures.

It has now been found that the process known up until now for the purification of gases with methanol may still be improved considerably, if the system in accordance with the invention, and the process that may be carried out therein for desorption of carbon dioxide, is employed.

OBJECT AND SUMMARY OF THE INVENTION

The object of the invention is therefore a system for desorption of carbon dioxide and other impurities from methanol held under high pressure, comprising one or a plurality of expansion vessels arranged in sequence, at least one heat exchanger and at least one liquid/gas separator, in which (a) A line (1) is provided through which the strongly cooled methanol leaving the expansion vessel C is introduced from below into the heat exchanger and (b) a line (2) is provided, through which the heated methanol above is transported from the top of the heat exchanger E, and is connected to a liquid/gas separator, in which the remaining carbon dioxide contained in the methanol is desorbed and separated to the greatest extent possible.

BRIEF DESCRIPTION OF THE DRAWING

FIG. 1 shows an entire installation for desorption of carbon dioxide and other impurities from methanol held at high pressure, while

SPECIFIC DESCRIPTION

Figure 1:
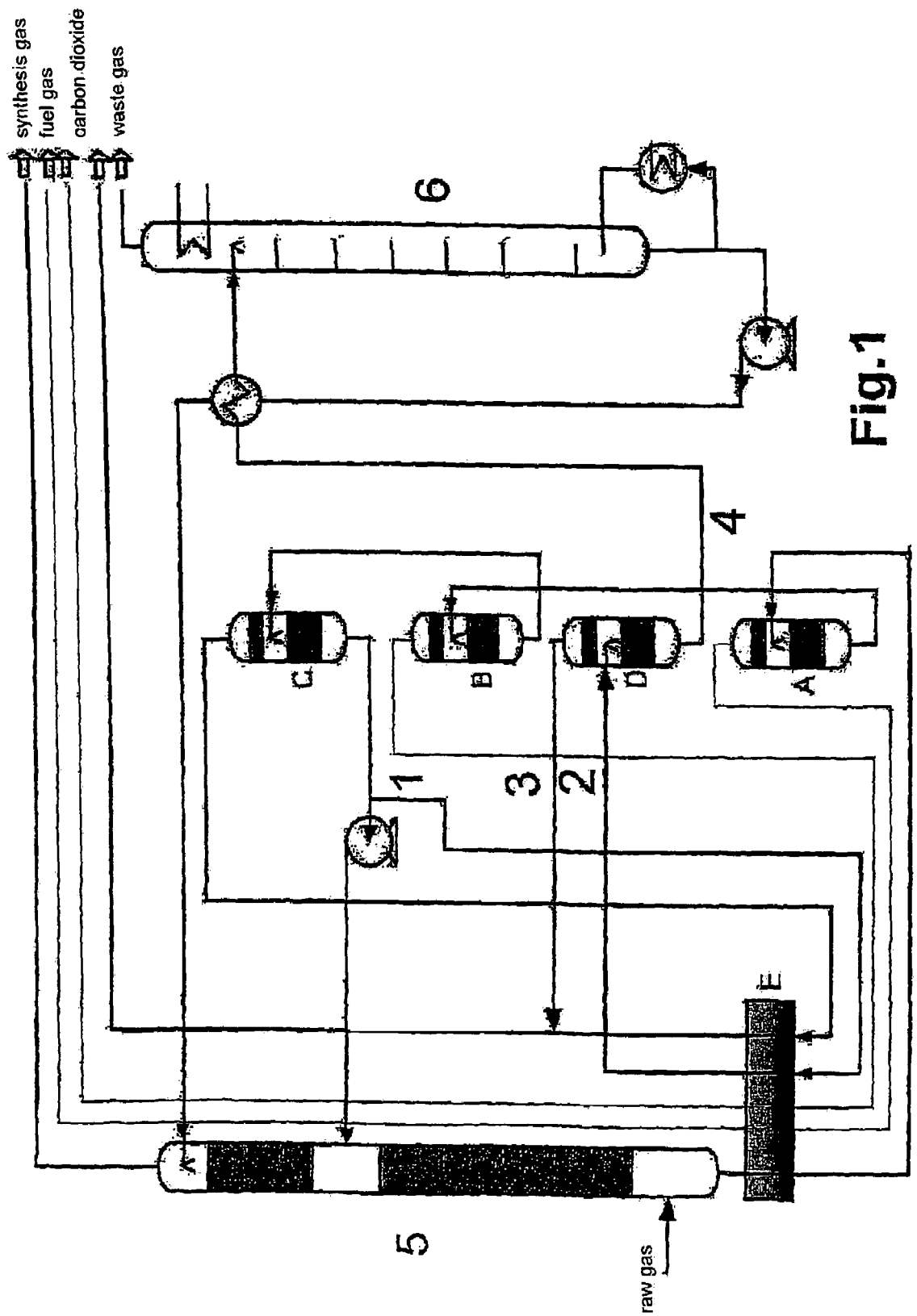
Figure 2:
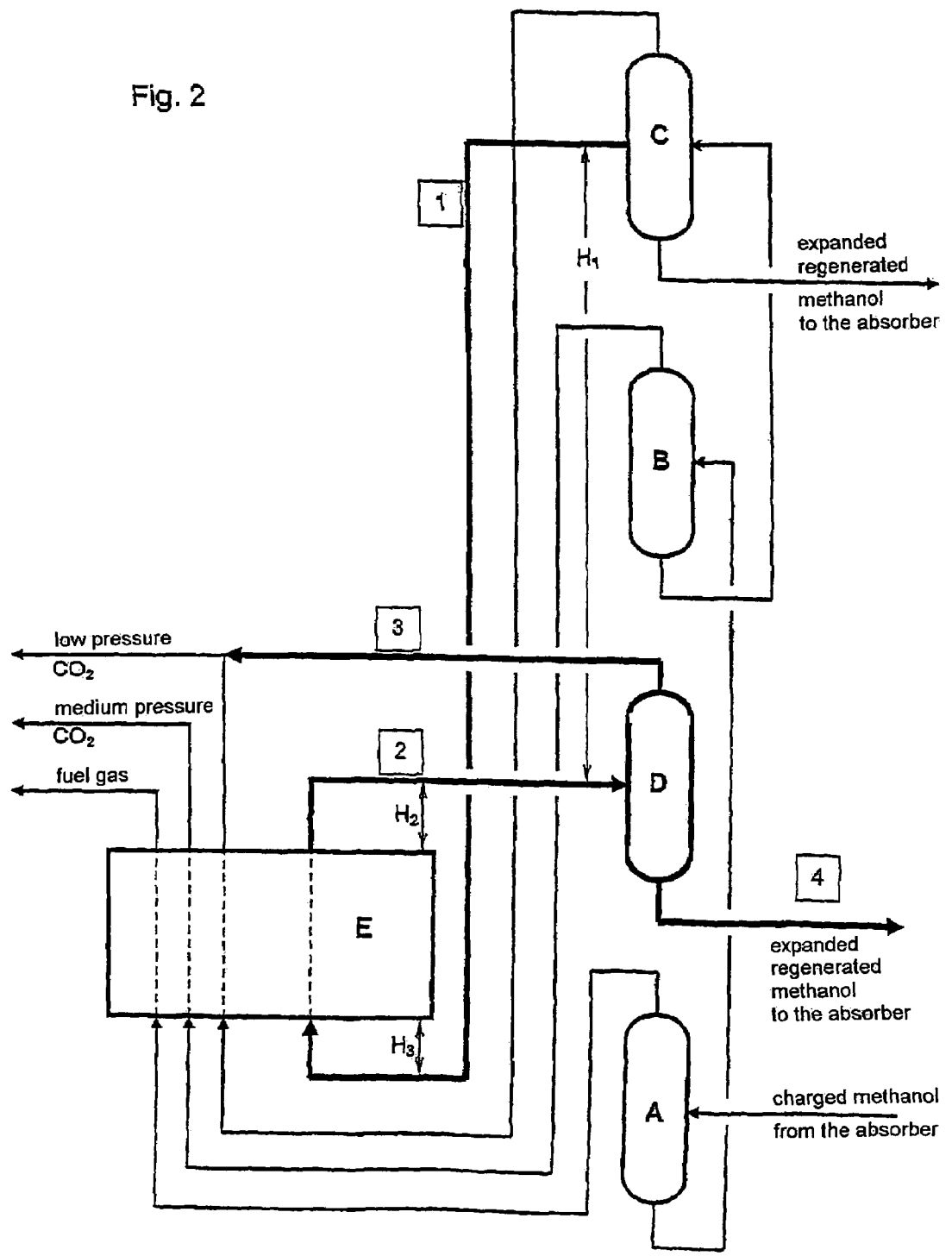
FIG. 2 depicts the system in accordance with the invention and discloses further technical details.

For effective implementation of the process in accordance with the invention it is of great importance that three reaction vessels C, D and E be arranged at a carefully determined height relative to each other. This allows one in fact to ensure that the liquid flows in the wanted direction through a heat exchanger E, without a pump being necessary. Liquid flow known as the thermo-siphon effect develops automatically as a result of gravity and the condensing carbon dioxide. This can only be achieved in the system in accordance with the invention in which:

(a) the liquid level in the downstream expansion vessel C is located about 1 to 20 m above the liquid level in the liquid-gas separator;

(b) this again is located about 0.5 m above the top-side discharge opening for the heated methanol provided in the heat exchanger E;

(c) the distance between the inlet line 1, from the bottom side of the heat exchanger E, for the methanol fed from the expansion vessel C, and the base of the heat exchanger E is about 0.5 m.

Self-evidently the system in accordance with the invention can be operated by use of pumps, however it is particularly advantageous to exploit application of the thermo-siphon effect so to automatically establish liquid flow through the various components of the system in accordance with the invention.

The system in accordance with the invention is downstream from an absorber 5, which is provided for purification of synthesis gas with methanol. In addition, in accordance with the invention a regenerator 6 is downstream from the system, in which, by further increasing the temperature and influx of a heated inert gas—such as for example methanol vapor—the remaining carbon dioxide is desorbed from the methanol.

In the absorber 5 the raw gas flowing in from below through the counter-flowing cold methanol is purified. The outgoing liquid from the base of the absorber 5, containing all the impurities of the raw gas, is cooled in the heat exchanger E and fed into the expansion vessel A. The purified synthesis gas leaves at the top of the absorber.

In the upstream expansion vessel A the methanol held under a pressure of 55 atmospheres is expanded to about 9 atmospheres and at a temperature of −45° C. desorbs mainly hydrogen and carbon monoxide, which after passage through the heat exchanger E are obtained as gas fractions for the process. The liquid fraction from the expansion vessel A is then fed through a line to a second or middle expansion vessel B.

In the middle expansion vessel B the methanol pressure is lowered from about 9 atmospheres to about 2.7 atmospheres and thereby a temperature decrease from about −45° C. to about −52° C. is obtained. In this case gaseous carbon dioxide is released from the methanol, which is passed through the heat exchanger E and may subsequently be credited to the process, while the liquid fraction obtained is fed to a third or downstream expansion vessel C.

In the downstream expansion vessel C the pressure of the methanol solution is decreased from about 2.7 atmospheres to about 1.2 atmospheres and thereby a further temperature decrease from about −52° C. to about −60° C. is observed. Also in this downstream expansion vessel C, gaseous carbon dioxide is obtained, which likewise is fed to heat exchanger E and can subsequently be credited to the process.

The liquid fraction obtained in the downstream expansion vessel C is then preferably divided into two streams, one stream being fed to the upstream absorber 5 and the second stream being fed through the line 1 to the heat exchanger E, which itself, for the methanol heated there, is connected by line 2 with the liquid-gas separator D.

The liquid-gas separator D has a branch line 3 for gaseous carbon dioxide, as well as another line in which liquid methanol 4 is taken from below the separator D and fed to the downstream regenerator 6. The liquid fraction 4 taken from the liquid/gas separator is fed to the downstream regenerator 6 to remove the last traces of carbon dioxide, which are extracted by further increasing the temperature and feeding in a stream of heated gas, for example methanol vapor. As carbon dioxide is taken from the process, the ultrapure methanol produced in the regenerator 6 is fed back to the absorber 5 and remains there to be available again for the purification of a fresh stream of raw gas.

Overall the process in accordance with the invention is therefore characterized in that carbon dioxide is desorbed from methanol stepwise in a plurality of expansion vessels, at least one heat exchanger, and at least one liquid/gas separator. Here the methanol leaving the expansion vessel has a temperature of −60±10° C. and a pressure of 1 to 2 atmospheres. The thermal energy recovered by the heat exchanger E represents a valuable energy source available for other cooling reactions. In this instance the temperature of the methanol stream increases in the heat exchanger to −10±5° C., and the liquid stream is fed to the liquid/gas separator at this temperature.

The process in accordance with the invention and the system associated with it thus make possible in an exceptionally purposeful manner the purification of enriched methanol, in the total removal of the contained pressurized gases and impurities, especially carbon dioxide. At the same time, the cold of vaporization resulting from desorption of carbon dioxide is recovered which is of great significance for absorption processing.

The material streams in the system in accordance with the invention show the indicated parameters in Table 1 below.

| Stream Parameters | Material Stream | | | |
|---|---|---|---|---|
| | 1 | 2 | 3 | 4 |
| Carbon Dioxide | 11.45 | 11.45 | 98.10 | 1.44 |
| Methanol | 88.55 | 88.55 | 1.92 | 98.56 |
| Temperature | −59.5 | −8.8 | −8.9 | −8.9 |
| Pressure (in absolute atm) | 1.20 | 1.20 | 1.15 | 1.15 |
| Vapor Proportion | 0.00 | 0.10 | 1.00 | 0.00 |
| Flow Velocity (t/h) | 585 | 585 | 80 | 505 |

The invention claimed is:

1. A system comprising:
   an absorber in which high-pressure methanol is contacted with synthesis gas to transfer impurities including carbon dioxide from the gas to the methanol;
   a heat exchanger having a top side and a bottom side;
   a plurality of series-connected expansion vessels including an upstream expansion vessel and a downstream expansion vessel;
   means for feeding impurity-laden methanol from the absorber through the heat exchanger, through the upstream expansion vessel, and into the downstream expansion vessel for forming in the downstream expansion vessel a body of methanol having a liquid level;
   a liquid/gas separator;
   an inlet line feeding methanol from the downstream expansion vessel through the bottom side into the heat exchanger, the inlet line having a portion about 0.5 m below the bottom side;
   an output line extending from the top side of the heat exchanger to the liquid/gas separator to form therein a body of methanol having a liquid level, whereby carbon dioxide is desorbed from the methanol in the separator, the liquid/gas separator and downstream expansion vessel being relatively oriented such that the liquid level in the downstream expansion vessel is between 1 m and 20 m above the liquid level in the liquid/gas separator, the liquid/gas separator and the heat exchanger being relatively oriented such that the liquid level in the liquid/gas separator is about 0.5 m above the top side of the heat exchanger; and
   a regenerator receiving methanol from the liquid-gas separator.

2. The system unit according to claim 1 wherein the expansion vessels further include a middle expansion vessel, the upstream expansion vessel for the gas mixture obtained by desorption comprising hydrogen and carbon monoxide having a line going to the heat exchanger and a line going to the middle expansion vessel for the methanol containing liquid.

3. The system unit according to claim 2 wherein the middle expansion vessel for the carbon dioxide gas obtained by desorption has a line going to the heat exchanger and a line going to the downstream expansion vessel for the methanol containing liquid.

4. The system unit according to claim 1 wherein the downstream expansion vessel for the gaseous carbon dioxide obtained by desorption has a line going to the heat exchanger and a line for the methanol containing liquid to the absorber connected by a line feeding the methanol heated up there to the liquid/gas separator.

5. The system unit according to claim 1 wherein the liquid/gas separator has a branch line feeding gaseous carbon dioxide and another line feeding separated methanol to the downstream regenerator.

6. A process for desorption of carbon dioxide and other gaseous impurities from methanol in the system in accordance with claim 1, wherein the desorption is carried out stepwise in the expansion vessels, the heat exchanger and the liquid/gas separator, the process comprising the steps of:
- feeding the methanol leaving the downstream expansion vessel at a temperature of −60° C.±10° C. and a pressure of 1 to 2 bar into the heat exchanger,
- heating the methanol in the heat exchanger to a temperature of −10±5° C. and thereafter feeding the heated methanol into the liquid/gas separator, and
- flowing substances between the expansion vessels and to the heat exchanger and liquid/gas separator primarily by a thermosiphon effect.

7. The process according to claim 6 wherein in the upstream expansion vessel the pressure decreases from about 55 bar to about 9 bar and mainly hydrogen and carbon monoxide are desorbed at a temperature of about −45° C., the method further comprising the steps of
- recovering a gas fraction obtained after passing through the heat exchanger to the process, and
- feeding the liquid fraction to a middle expansion vessel between the upstream and downstream vessels.

8. The process according to claim 6 wherein in a middle expansion vessel between the upstream and downstream vessels the pressure decreases from about 9 bar to about 2.7 bar and a liquid fraction is obtained along with gaseous carbon dioxide at a temperature of about −45° C., to about −52° C., the process further comprising the step of
- feeding the gaseous carbon dioxide through the heat exchanger E and thence out of the system feeding the liquid fraction to the downstream expansion vessel.

9. The process according to claim 6 wherein, in the downstream expansion vessel pressure decreases from about 2.7 bar to about 1.2 bar and gaseous carbon dioxide is obtained at a temperature of about −52° C., to about −60° C., the process further comprising the step of
- feeding the gaseous carbon dioxide through the heat exchanger and thence out of the system.

10. The process according to claim 6, further comprising the steps of
- dividing a liquid fraction in the downstream expansion vessel C into two streams,
- feeding one of the streams to the absorber and
- passing the other stream through the heat exchanger via the output line and feeding it to the liquid/gas absorber.

11. The process according to claim 6, further comprising the steps of:
- recovering a liquid fraction in the liquid/gas separator,
- feeding the recovered liquid fraction to the regenerator for removal of the last traces of carbon dioxide, and
- purifying a gas fraction with further carbon dioxide rich gas fractions.

* * * * *